US009876276B2

(12) United States Patent
Bengtsson et al.

(10) Patent No.: US 9,876,276 B2
(45) Date of Patent: Jan. 23, 2018

(54) DEVICE WITH RADIO AND BODY-COUPLED-COMMUNICATION CONNECTIVITY

(71) Applicant: Sony Mobile Communications, Inc., Tokyo (JP)

(72) Inventors: Erik Bengtsson, Eslöv (SE); Ying Zhinong, Lund (SE)

(73) Assignee: Sony Mobile Communications, Inc., Tokyo (JP)

( * ) Notice: Subject to any disclaimer, the term of this patent is extended or adjusted under 35 U.S.C. 154(b) by 311 days.

(21) Appl. No.: 14/248,656

(22) Filed: Apr. 9, 2014

(65) Prior Publication Data

US 2015/0295304 A1  Oct. 15, 2015

(51) Int. Cl.
*H01Q 1/12* (2006.01)
*H01Q 1/27* (2006.01)
*H01Q 9/04* (2006.01)
*H04W 4/00* (2009.01)
*H04B 13/00* (2006.01)

(52) U.S. Cl.
CPC ........... *H01Q 1/273* (2013.01); *H01Q 9/0407* (2013.01); *H04B 13/005* (2013.01); *H04W 4/008* (2013.01)

(58) Field of Classification Search
USPC .......................... 343/718, 702, 700 MS, 866
See application file for complete search history.

(56) References Cited

U.S. PATENT DOCUMENTS

| | | | | |
|---|---|---|---|---|
| 6,950,065 B2* | 9/2005 | Ying | ...................... | H01Q 1/243 343/700 MS |
| 7,420,438 B2* | 9/2008 | Nakai | ...................... | H01P 1/213 333/133 |
| 7,450,072 B2* | 11/2008 | Kim | ...................... | H01Q 1/243 343/700 MS |
| 7,606,184 B2* | 10/2009 | Liu | ...................... | H03H 7/463 370/297 |
| 7,825,863 B2* | 11/2010 | Martiskainen | ......... | H01Q 1/243 343/700 MS |
| 8,150,319 B2* | 4/2012 | Yoshida | ................... | H04B 5/00 343/718 |
| 9,485,034 B2* | 11/2016 | Bolin | ................... | H04B 13/005 |

* cited by examiner

*Primary Examiner* — Jessica Han
*Assistant Examiner* — Hai Tran
(74) *Attorney, Agent, or Firm* — Wolf, Greenfield & Sacks, P.C.

(57) ABSTRACT

A device is equipped with one or more communication modules supporting communication on the basis of radio signals and communication on the basis of body-coupled communication signals. Further, the device is equipped with an antenna for transmission of the radio signals. The antenna is further operable to transfer the body-coupled communication signals between the device and a body of a user of the device.

24 Claims, 7 Drawing Sheets

DEVICE WITH RADIO AND BODY-COUPLED-COMMUNICATION CONNECTIVITY

FIELD OF THE INVENTION

The present invention relates to a device with a radio and a body-coupled communication (BCC) connectivity and to a method of communication using radio transmission and BCC transmission.

BACKGROUND OF THE INVENTION

The BCC technology is based on utilizing a body of a living being as a transmission medium for communication signals. In particular it may be used for establishing a communication link to devices which are in contact with the body. Such devices may for example correspond to medical sensors or monitoring devices. However, the BCC technology may also be used for other kinds of devices, e.g., for connecting a smart phone or similar user device to another device.

For supporting BCC connectivity of a device, it typically needs to be provided with a BCC coupling element. Such BCC coupling element may for example comprise an electrode for providing capacitive coupling to the body. A typical size of such electrode may be in the range of 12 mm×12 mm, i.e., 144 mm². On the other hand, the available space in the device may be limited.

Accordingly, there is a need for techniques which allow for efficiently supporting BCC connectivity of a device.

SUMMARY OF THE INVENTION

According to an embodiment of the invention, a device is provided. The device comprises at least one communication module. The communication module supports communication on the basis of radio signals and communication on the basis of BCC signals. Further, the device comprises an antenna for transmission, i.e., sending and/or receiving, of the radio signals. The antenna is further operable to transfer the BCC signals between the device and a body of a user of the device. This transfer may occur simultaneously with the transmission of the radio signals.

According to an embodiment, the device further comprises a frequency selective element connected between the antenna and the at least one communication module. The frequency selective element provides a first signal path in a first frequency range corresponding to the radio signals and a second signal path in a second frequency range corresponding to the BCC signals. According to an embodiment, the first signal path has a high-pass filter characteristic and the second signal path has a low-pass filter characteristic. According to an embodiment, the first frequency range is above 500 MHz, typically above 600 MHz, and the second frequency range is below 50 MHz, more specifically below 20 MHz.

According to an embodiment, the antenna and the frequency selective element are formed on the same printed circuit board.

According to an embodiment, the antenna is of an L-type. In this case, the frequency selective element may be connected between a feed connection of the antenna and the at least one communication module.

Alternatively, the antenna may be of an F-type. In this case, the frequency selective element may be connected between a feed connection and the at least one communication module. The device may then further comprise a capacitor connected between a grounding connection of the antenna and a grounding point, e.g., a ground plane. Alternatively, the frequency selective element may be connected between a grounding connection of the antenna and the at least one communication module. In particular, the first signal path of the frequency selective element may be connected between the grounding connection and a grounding point, e.g., a ground plane, and the second signal path of the frequency selective element may be connected between the grounding connection and the at least one communication module. The device may then further comprise a capacitor connected between a feed connection of the antenna and the at least one communication module.

According to a further embodiment, the antenna is of a capacitilvely or inductively fed type, in particular of a C-fed type. In this case the first signal path of the above-mentioned frequency selective element may be connected between a grounding point, e.g., a ground plane, and a grounding connection of a parasitic element of the antenna. The second signal path of the frequency selective element may be connected between the grounding point and the at least one communication module.

According to a further embodiment of the invention, a method is provided. According to the method a device communicates data on the basis of radio signals. This is accomplished via an antenna of the device. Further, the device communicates data on the basis of BCC signals. The BCC signals are transferred via the antenna between the device and a body of a user of the device.

According to an embodiment, the device provides a first signal path to the antenna and a second signal path to the antenna. The first signal path is frequency selective in a first frequency range corresponding to the radio signals. The second signal path is frequency selective in a second frequency range corresponding to the body-coupled-communication signals. According to an embodiment, the first signal path has a high-pass filter characteristic and the second signal path has a low-pass filter characteristic. According to an embodiment, the first frequency range is above 500 MHz, typically above 600 MHz, and the second frequency range is below 50 MHz, more specifically below 20 MHz.

According to an embodiment, the radio signals are based on a cellular radio technology, such as GSM (Global System for Mobile Communications), UMTS (Universal Mobile Telecommunications System), LTE (Long Term Evolution), or CDMA2000. Alternatively or in addition, the radio signals may be based on a wireless local area network (WLAN) technology or on a wireless personal area network radio (WPAN) technology, such as Bluetooth, Near Field Communication (NFC), or ZigBee. Further, the radio signals may be based on a satellite navigation technology, such as GPS (Global Positioning System).

The above and further embodiments of the invention will now be described in more detail with reference to the accompanying drawings.

DETAILED DESCRIPTION OF EMBODIMENTS

Figure 1:
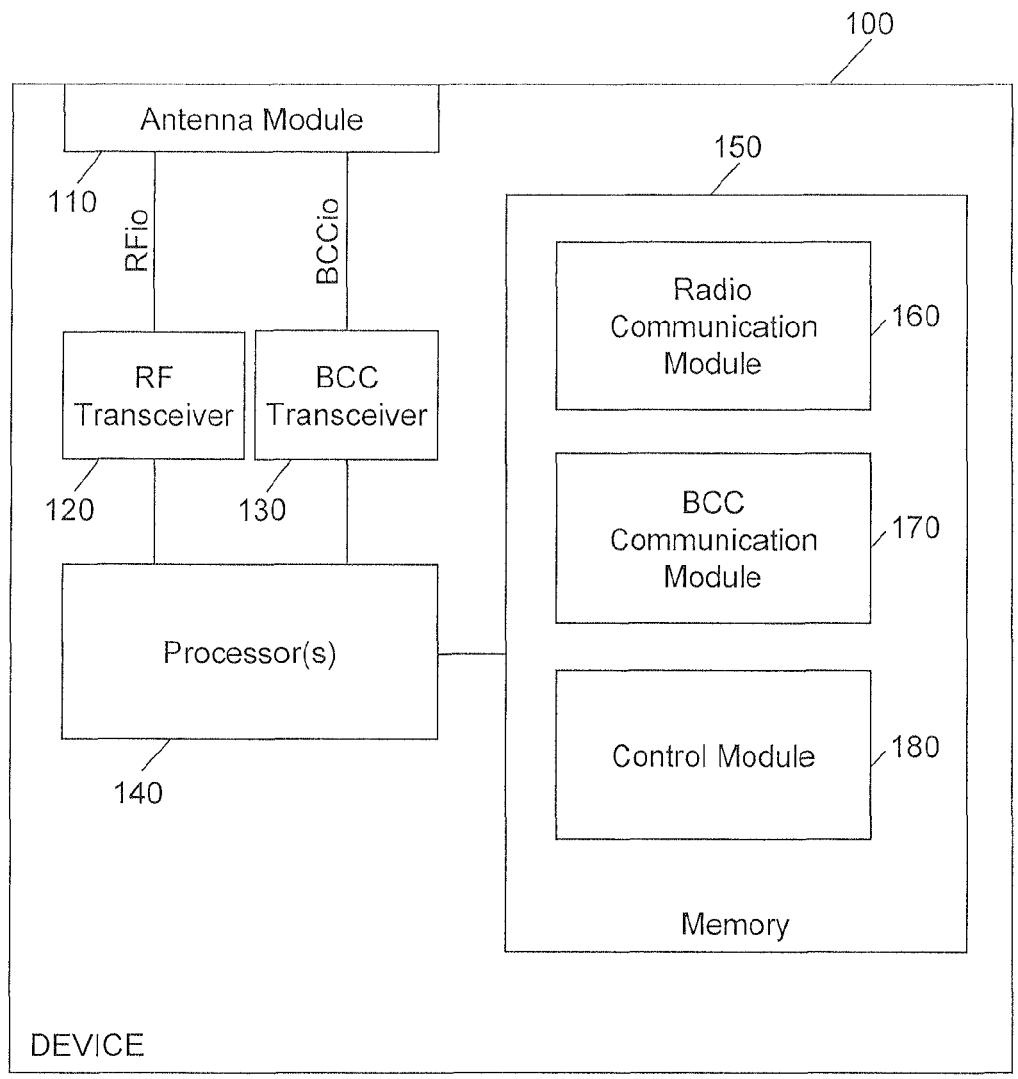
FIG. 1 schematically illustrates a device according to an embodiment of the invention.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to a device which supports both radio connectivity and BCC connectivity. The device may for example be a communication device, such as a smart phone or mobile phone. The device may also correspond to a portable computing device, such as a training computer, a health monitor, or an entertainment device, such as a media player or portable gaming device.

The radio connectivity may be based on one or more radio technologies, such as GSM, UMTS, LTE, or CDMA2000. Alternatively or in addition, the radio connectivity may also be based on a WLAN technology or on a WPAN radio technology, such as Bluetooth, NFC, or ZigBee. Still further, the radio connectivity may support reception of satellite navigation signals, such as GPS signals. In the illustrated embodiments, the radio connectivity is assumed to utilize radio signals in a frequency range above 500 MHz, in particular above 600 MHz, while the BCC connectivity is assumed to utilize BCC signals in a frequency range below 50 MHz, typically below 20 MHz. The BCC signals are assumed to be transmitted via the body of a user of the device. For example, the BCC signals may be transmitted between the device and one or more other devices located on or in close proximity to the user's body and equipped with BCC connectivity. Such other device may for example be wearable device, e.g., a wristband. Such other device may also correspond to a headset. In some application scenarios, the BCC signals may also be used for assisting in establishing a radio connection. For example, the BCC signals may be used to detect that another device is present on the user's body, and the BCC signals may then be used to trigger establishment of a radio connection to the other device, e.g., using the Bluetooth technology. In further application scenarios, the BCC signals may be used for locking or unlocking a lock, e.g., on a door or of a container, e.g., when the user touches the lock. In some applications, the BCC signals may also be used for payment services, e.g., for authorizing payment when the user touches a payment terminal or the like.

In the illustrated concepts, the device supports radio connectivity and BCC connectivity. For efficiently supporting the BCC connectivity, an antenna for the transmission of the radio signals is also utilized as a BCC coupling element which transfers the BCC signals between the device and the user's body. In this way, the BCC connectivity can be supported in an efficient manner, without requiring a dedicated BCC coupling element. This is beneficial in view of the available space in the device and also in view of manufacturing costs.

FIG. 1 schematically illustrates exemplary structures for implementing the device 100.

As illustrated, the device 100 includes an antenna module 110, an RF (radio frequency) transceiver 120, a BCC transceiver 130. Both the RF transceiver 120 and the BCC transceiver 130 are coupled to the antenna module 110. Radio signals transferred between the RF transceiver 120 and the antenna module 110 are denoted by RFio, and BCC signals transferred between the BCC transceiver 130 and the antenna module 110 are denoted by BCCio. Further, the device 100 includes one or more processors 140 coupled to the RF transceiver 120 and to the BCC transceiver 130, and a memory 150 coupled to the processor(s) 140. The memory 150 includes program code modules 160, 170, 180 with program code to be executed by the processor(s) 140. In the illustrated example, these program code modules include a radio communication module 160, a BCC communication module 170, and a control module 180.

The RF transceiver 120, the processor(s) 140, and the radio communication module 160 implement radio communication functionalities of the device 100, i.e., may be regarded as a radio communication module of the device 100. For example, the RF transceiver 120 may provide hardware structures for physical layer processing of the radio signals, e.g., for detection, modulation, demodulation, amplification, conversion, or the like. The program code of the radio communication module 160 executed by the processor(s) 140 may in turn provide higher layer functionalities, e.g., for encoding, decoding, error correction, or protocol handling.

The BCC transceiver 130, the processor(s) 140, and the BCC communication module 170 implement BCC communication functionalities of the device 100, i.e., may be regarded as a BCC communication module of the device 100. For example, the BCC transceiver 130 may provide hardware structures for physical layer processing of the BCC signals, e.g., for detection, modulation, demodulation, amplification, conversion, or the like. The program code of the radio communication module 170 executed by the processor(s) 140 may in turn provide higher layer functionalities, e.g., for encoding, decoding, error correction, or protocol handling.

The control module 180 may have the purpose of implementing generic control functionalities of the device 100, e.g., with respect to managing the radio communication functionalities and BCC functionalities.

It is to be understood that the structures as illustrated in FIG. 1 are merely exemplary and that the device 100 may also include other elements which have not been illustrated, e.g., structures or program code modules for implementing a user interface of the device 100.

Figure 2:
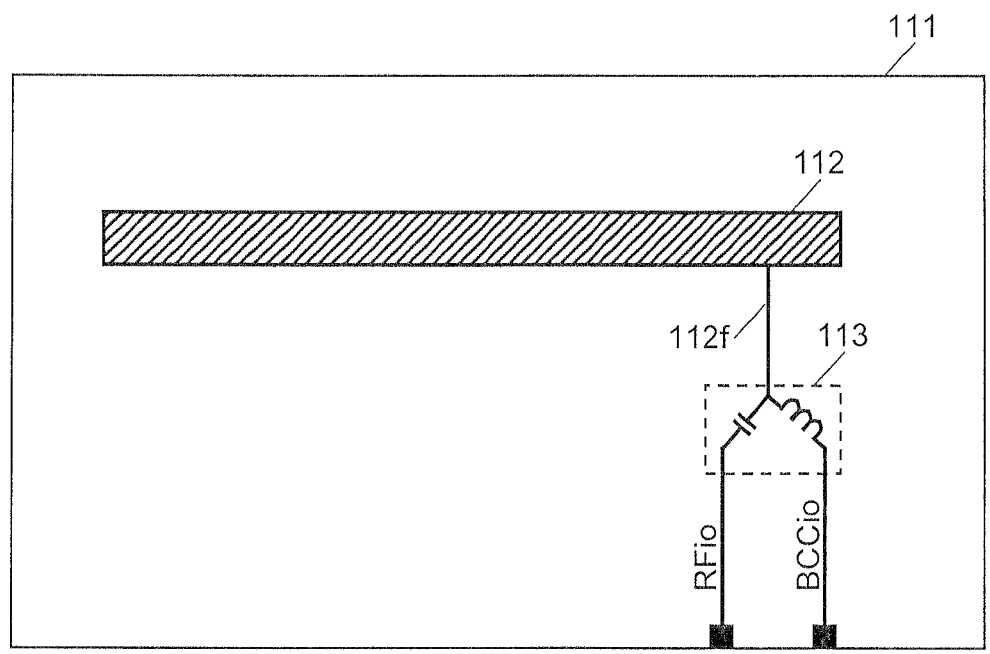
FIG. 2 schematically illustrates an antenna module with an L-type antenna according to an embodiment of the invention.

FIG. 2 schematically illustrates an exemplary implementation of the antenna module 110. In the example of FIG. 2, the antenna module 110 is based on an L-type antenna 112 which is implemented on a printed circuit board (PCB) 111. As illustrated, the L-type antenna 112 is a monopole antenna provided with a single feed connection 112f. This feed connection 112f is used for providing the radio signals RFio to be transmitted from the RF transceiver 120 to the L-type antenna 112 and for carrying the received radio signals RFio from the L-type antenna 112 to the RF transceiver 120. Further, the feed connection 112f is used for providing the BCC signals BCCio to be transmitted from the BCC transceiver 130 to the L-type antenna 112 and for carrying the received BCC signals BCCio from the L-type antenna 112 to the BCC transceiver 130.

As further illustrated, the antenna module 110 is provided with a frequency selective element 113 which is connected between the feed connection 112f and respective feed terminals for the radio signals RFio and for the BCC signals BCCio. In the illustrated example, the frequency selective element 113 is implemented as a diplexer-type filter. As illustrated, the diplexer-type filter may be implemented in an efficient manner using lumped components, e.g., a capacitor and an inductor. Further, the frequency-selective element may be efficiently implemented together with the L-type antenna 112 on the PCB 111 of the antenna module 110.

The frequency selective element 113 provides a first signal path which is frequency selective in a frequency range of the radio signals RFio, and a second signal path which is frequency selective in a frequency range of the BCC signals. The first signal path, which extends from the feed terminal for the radio signals RFio via the capacitor of the frequency selective element 113 to the feed connection 112f of the L-type antenna 112, has a high-pass characteristic which selectively passes signals in a frequency range above 500 MHz, typically above 600 MHz, which corresponds to the frequency range of the radio signals RFio. Other signals, such as the BCC signals BCCio, are blocked. The second signal path, which extends from the feed terminal for the BCC signals BCCio via the inductor of the frequency selective element 113 to the feed connection 112f of the L-type antenna, has a low-pass characteristic which selectively passes signals in a frequency range below 50 MHz, more specifically below 20 MHz, which corresponds to the frequency range of the BCC signals. Other signals, such as the radio signals RFio, are blocked. In the illustrated implementation, the frequency selective element 113 allows for simultaneously using the L-type antenna 112 both as antenna for sending or receiving the radio signals RFio and as a coupling element for transferring the BCC signals to or from the user's body. The latter may be achieved by capacitive coupling to the user's body.

It is to be understood that the structures as shown in FIG. 2 are intended to provide a simplified illustration and that the actual geometry and dimensioning of the illustrated structures may be differ in practical implementations. In particular, the L-type antenna 112 may be designed according to various known principles with the aim of optimizing characteristics of the L-type antenna 112 with respect to the utilized radio technology or radio technologies. The L-type antenna 112 may have a generally L-shaped geometry or a generally inverted L-shaped geometry, e.g., be configured as an inverted L antenna (ILA) or planar inverted L antenna (PILA). Similarly, the PCB 111 may be designed to meet space requirements and/or other design criteria of the device 100.

Figure 3:
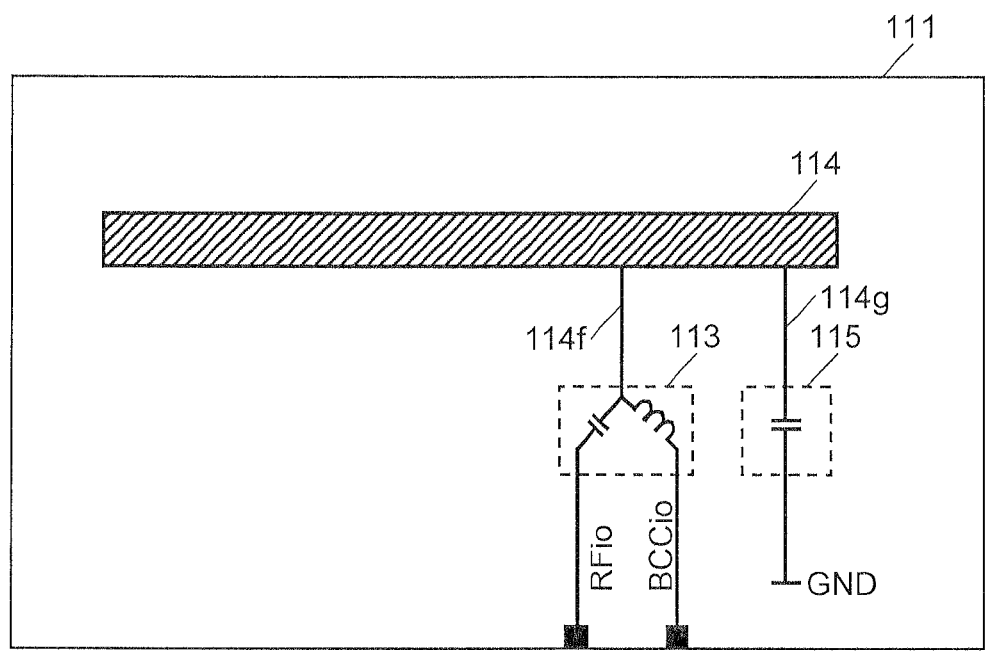
FIG. 3 schematically illustrates an antenna module with an F-type antenna according to an embodiment of the invention.

FIG. 3 schematically illustrates a further exemplary implementation of the antenna module 110. In the example of FIG. 3, the antenna module 110 is based on an F-type antenna 114 which is implemented on a PCB 111. As illustrated, the F-type antenna 114 is a monopole antenna provided with a feed connection 114f and an additional grounding connection 114g. The feed connection 114f is used for providing the radio signals RFio to be transmitted from the RF transceiver 120 to the F-type antenna 114 and for carrying the received radio signals RFio from the F-type antenna 114 to the RF transceiver 120. Further, the feed connection 114f is used for providing the BCC signals BCCio to be transmitted from the BCC transceiver 130 to the F-type antenna 114 and for carrying the received BCC signals BCCio from the F-type antenna 114 to the BCC transceiver 130.

As further illustrated, the antenna module 110 is provided with a frequency selective element 113 which is connected between the feed connection 114f and respective feed terminals for the radio signals RFio and for the BCC signals BCCio. In the illustrated example, the frequency selective element 113 is implemented as a diplexer-type filter. As illustrated, the diplexer-type filter may be implemented in an efficient manner using lumped components, e.g., a capacitor and an inductor. Further, the frequency-selective element may be efficiently implemented together with the F-type antenna 114 on the PCB 111 of the antenna module 110.

The frequency selective element 113 provides a first signal path which is frequency selective in a frequency range of the radio signals RFio, and a second signal path which is frequency selective in a frequency range of the BCC signals. The first signal path, which extends from the feed terminal for the radio signals RFio via the capacitor of the frequency selective element 113 to the feed connection 114f of the F-type antenna 112, has a high-pass characteristic which selectively passes signals in a frequency range above 500 MHz, typically above 600 MHz, which corresponds to the frequency range of the radio signals RFio. Other signals, such as the BCC signals BCCio, are blocked. The second signal path, which extends from the feed terminal for the BCC signals BCCio via the inductor of the frequency selective element 113 to the feed connection 114f of the F-type antenna, has a low-pass characteristic which selectively passes signals in a frequency range below 50 MHz, more specifically below 20 MHz, which corresponds to the frequency range of the BCC signals. Other signals, such as the radio signals RFio, are blocked. In the illustrated implementation, the frequency selective element 113 allows for simultaneously using the F-type antenna 114 both as antenna for sending or receiving the radio signals RFio and as a coupling element for transferring the BCC signals to or from the user's body. The latter may be achieved by capacitive coupling to the user's body.

As further illustrated, the antenna module 110 of FIG. 3 further includes a capacitor 115 which is coupled between the grounding connection 114g of the F-type antenna 114 and a grounding point GND. The grounding point GND may for example correspond to a ground plane of the device 100. The capacitor 115 acts as a further frequency selective element which prevents short-circuiting of the low-frequency BCC signals BCCio to the grounding point GND.

Figure 4:
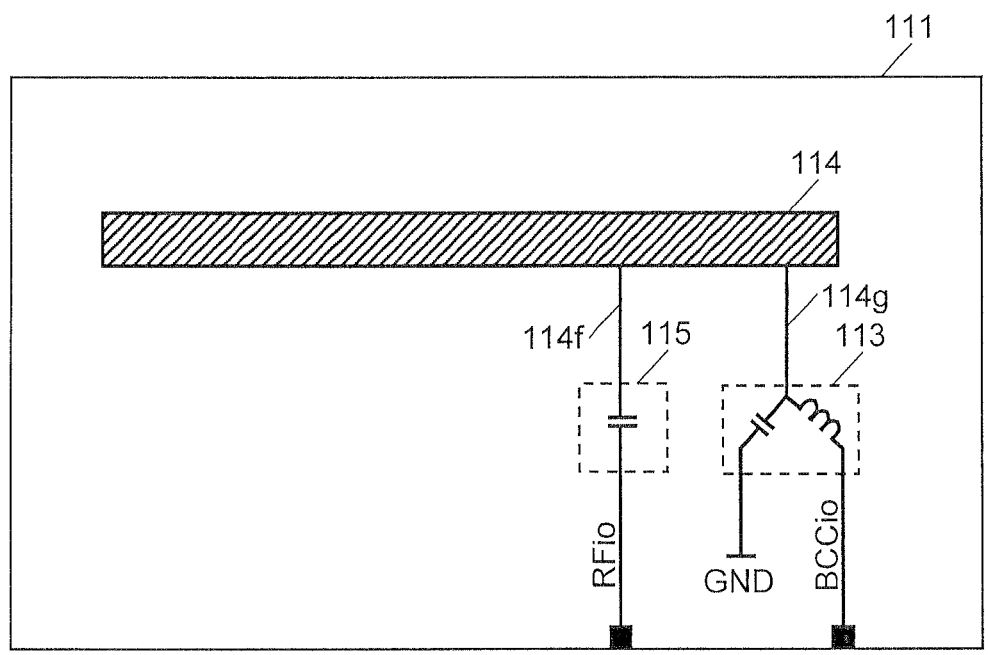
FIG. 4 schematically illustrates an antenna module with an F-type antenna according to a further embodiment of the invention.

FIG. 4 schematically illustrates a further exemplary implementation of the antenna module 110. Also in the example of FIG. 4, the antenna module 110 is based on an F-type antenna 114, and is similar to the implementation of FIG. 3. However, in the implementation of FIG. 4 the grounding connection 114g of the F-type antenna 114 is used for providing the BCC signals BCCio to be transmitted from the BCC transceiver 130 to the F-type antenna 114 and for carrying the received BCC signals BCCio from the F-type antenna 114 to the BCC transceiver 130. The feed connection 114f is used for providing the radio signals RFio to be transmitted from the RF transceiver 120 to the F-type antenna 114 and for carrying the received radio signals RFio from the F-type antenna 114 to the RF transceiver 120.

As compared to the implementation of FIG. 3, in the implementation of FIG. 4 the frequency selective element 113 is connected between the grounding connection 114g and the feed terminal for the BCC signals BCCio. The capacitor 115 is connected between the feed connection 114f and the feed terminal for the radio signals RFio. Also in the implementation of FIG. 4, the frequency selective element 113 provides a first signal path which is frequency selective in a frequency range of the radio signals RFio, and a second signal path which is frequency selective in a frequency range of the BCC signals. The first signal path, which extends from the grounding point GND via the capacitor of the frequency selective element 113, the grounding connection 114g, the feed connection 114f, and the capacitor 115 to the feed terminal for the radio signals RFio, has a high-pass characteristic which selectively passes signals in a frequency range above 500 MHz, typically above 600 MHz, which corresponds to the frequency range of the radio signals RFio. Other signals, such as the BCC signals BCCio, are blocked. The second signal path, which extends from the feed terminal for the BCC signals BCCio via the inductor of the frequency selective element 113 to the grounding connection 114g, has a low-pass characteristic which selectively passes signals in a frequency range below 50 MHz, more specifically below 20 MHz, which corresponds to the frequency range of the BCC signals. Other signals, such as the radio signals RFio, are blocked. Also in the implementation of FIG. 4, the frequency selective element 113 allows for simultaneously using the F-type antenna 114 both as an antenna for sending or receiving the radio signals RFio and as a coupling element for transferring the BCC signals BCCio to or from the user's body. The latter may be achieved by capacitive coupling to the user's body.

It is to be understood that the structures as shown in FIGS. 3 and 4 are intended to provide a simplified illustration and that the actual geometry and dimensioning of the illustrated structures may be differ in practical implementations. In particular, the F-type antenna 114 may be designed according to various known principles with the aim of optimizing characteristics of the F-type antenna 114 with respect to the utilized radio technology or radio technologies. The F-type antenna 114 may have a generally F-shaped geometry or a generally inverted F-shaped geometry, e.g., be configured as an inverted F antenna (IFA) or planar inverted F antenna (PIFA). In some implementations, the F-type antenna 114 may also have a topology with multiple grounding connections. In such cases, a capacitor may be coupled between each of these multiple grounding connections and the grounding point GND, similar to the capacitor 115. In some implementations, the F-type antenna 114 may also have a loop geometry. Further, the PCB 111 may be designed to meet space requirements and/or other design criteria of the device 100.

Figure 5:
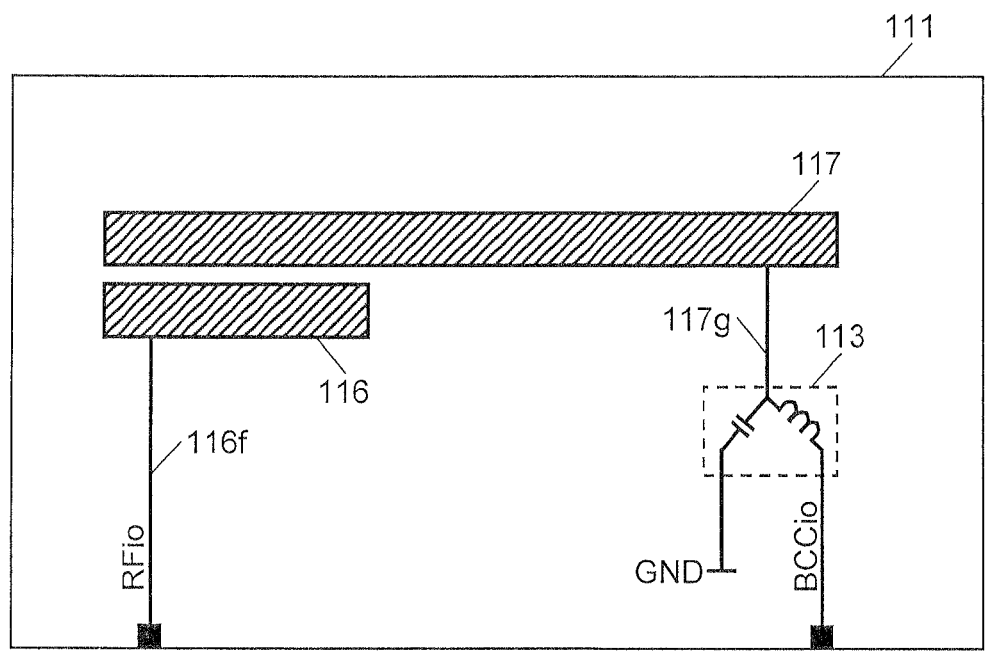
FIG. 5 schematically illustrates an antenna module with a capacitively or inductively fed antenna according to an embodiment of the invention.

FIG. 5 schematically illustrates a further exemplary implementation of the antenna module 110. In the example of FIG. 5, the antenna module 110 is based on a capacitively fed (C-fed) antenna which includes a feed element 116 and a parasitic element 117 which is capacitively coupled to the feed element 116. The feed element 116 and the parasitic element 117 are implemented on a PCB 111. As illustrated, the C-fed antenna 116, 117 is a monopole antenna provided with a feed connection 116f to the feed element 116 and a grounding connection 117g to the parasitic element 117. The feed connection 116f is used for providing the radio signals RFio to be transmitted from the RF transceiver 120 to the C-fed antenna 116, 117 and for carrying the received radio signals RFio from the C-fed antenna 116, 117 to the RF transceiver 120. The grounding connection 117g is on the one hand used for coupling the parasitic element 117 to a grounding point GND, e.g., a ground plane of the device, and on the other hand used for providing the BCC signals BCCio to be transmitted from the BCC transceiver 130 to the parasitic element 117 of the C-fed antenna 116, 117 and for carrying the received BCC signals BCCio from the parasitic element 117 of the C-fed antenna 116, 117 to the BCC transceiver 130.

As further illustrated, the antenna module 110 is provided with a frequency selective element 113 which is connected between the grounding connection 117g of the parasitic element 117 and a feed terminal for the BCC signals BCCio as well as between the grounding connection 117g of the parasitic element 117 and the grounding point GND. In the illustrated example, the frequency selective element 113 is implemented as a diplexer-type filter. As illustrated, the diplexer-type filter may be implemented in an efficient manner using lumped components, e.g., a capacitor and an inductor. Further, the frequency-selective element may be efficiently implemented together with the C-fed antenna 116, 117 on the PCB 111 of the antenna module 110.

The frequency selective element 113 provides a first signal path which is frequency selective in a frequency range of the radio signals RFio, and a second signal path which is frequency selective in a frequency range of the BCC signals. The first signal path, which extends from the grounding point GND via the capacitor of the frequency selective element 113, the grounding connection 117g, the parasitic element 117, the feed element 116, and the feed connection 116f to a feed terminal for the radio signals RFio, has a high-pass characteristic which selectively passes signals in a frequency range above 500 MHz, typically above 600 MHz, which corresponds to the frequency range of the radio signals RFio. Other signals, such as the BCC signals BCCio, are blocked. The second signal path, which extends from the feed terminal for the BCC signals BCCio via the inductor of the frequency selective element 113 to the grounding connection 117g of the parasitic element 117, has a low-pass characteristic which selectively passes signals in a frequency range below 50 MHz, more specifically below 20 MHz, which corresponds to the frequency range of the BCC signals. Other signals, such as the radio signals RFio, are blocked. In the illustrated implementation, the frequency selective element 113 allows for simultaneously using the parasitic element 117 of the C-fed antenna 116, 117 both as antenna for sending or receiving the radio signals RFio and as a coupling element for transferring the BCC signals BCCio to or from the user's body. The latter may be achieved by capacitive coupling to the user's body.

It is to be understood that the structures as shown in FIG. 5 are intended to provide a simplified illustration and that the actual geometry and dimensioning of the illustrated structures may be differ in practical implementations. In particular, the C-fed antenna 116, 117 may be designed according to various known principles with the aim of optimizing characteristics of the C-fed antenna 116, 117 with respect to the utilized radio technology or radio technologies. In typical implementations, the parasitic element 117 is dimensioned larger than the feed element 116. However, other configurations are possible as well. Further, the C-fed antenna could be provided with multiple parasitic elements, i.e., further parasitic elements in addition to the parasitic element 117. In some implementations, the parasitic element 117 may also have multiple grounding connections. Further, alternatively or in addition to the capacitive coupling between the feed element 116 and the parasitic element 117, also inductive coupling could be utilized. Further, the PCB 111 may be designed to meet space requirements and/or other design criteria of the device 100.

Figure 6:
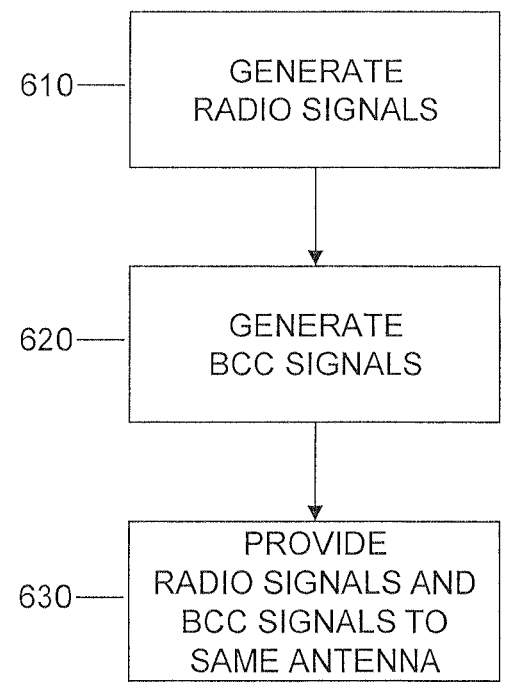
FIG. 6 shows a flowchart for illustrating a method of sending data according to an embodiment of the invention.
Figure 7:
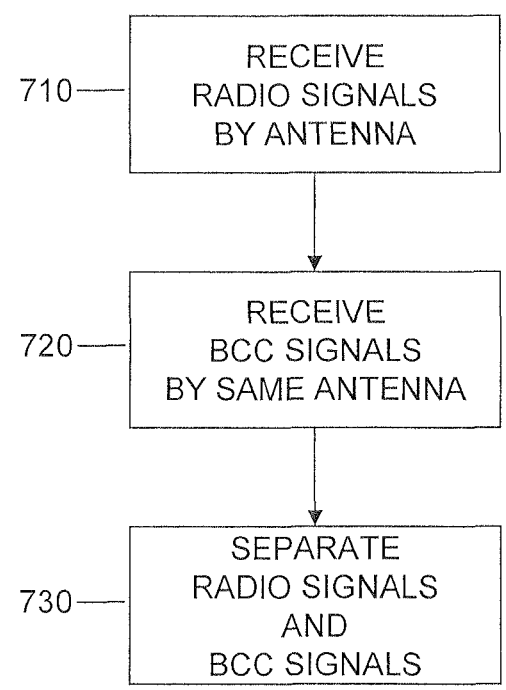
FIG. 7 shows a flowchart for illustrating a method of receiving data according to an embodiment of the invention.

FIGS. 6 and 7 show flowcharts for illustrating methods which may be used for implementing communication of data using the above-described concepts. These methods involve that a device a device communicates data on the basis of radio signals via an antenna of the device and that the device further communicates data on the basis of BCC signals which are transferred via the antenna between the device and a body of a user of the device. The device may for example correspond to the above-mentioned device 100, and execution of the method steps described in the following may be controlled by the processor(s) 140 of the device 100, e.g., on the basis of program code stored in the memory 150. The antenna may for example be an L-type antenna, such as explained in connection with FIG. 2, an F-type antenna, such as explained in connection with FIGS. 3 and 4, or a capacitively or inductively fed antenna, e.g., a C-fed antenna, such as explained in connection with FIG. 5.

FIG. 6 illustrates a method which may be used for sending of data by the device.

At step 610, the device generates radio signals. The radio signals may for example be in a first frequency range above 500 MHz, typically above 600 MHz. The radio signals may be based on one or more cellular radio technologies, e.g., GSM, UMTS, LTE, CDMA2000. In addition or as an alternative, the radio signals may be based on a WLAN technology and/or on a WPAN radio technology, such as Bluetooth, NFC, or ZigBee. The generation of the radio signals may for example be performed by a communication module of the device, e.g., as in the case of the device 100 implemented by the RF transceiver 120 and the processor(s) 140 executing the program code of the radio communication module 160. The generation of the radio signals may for example involve encoding of data and/or modulation of one or more carriers with the data.

At step 620, the device generates BCC signals. The BCC signals may for example be in a second frequency range below 50 MHz, more specifically below 20 MHz. The generation of the BCC signals may for example be performed by a communication module of the device, e.g., as in the case of the device 100 implemented by the BCC transceiver 130 and the processor(s) 140 executing the program code of the BCC communication module 170. The generation of the BCC signals may for example involve encoding of data and/or modulation of one or more carriers with the data.

At step 630, the device provides the radio signals and the BCC signals to the antenna. Accordingly, the antenna of the device is not only operated to convert the radio signals to electromagnetic waves for transmitting data from the device, but also acts as a BCC coupling element for transferring the BCC signals to the body of a user of the device, e.g., by capacitive coupling. For this purpose, the device may provide a first signal path to the antenna, the first signal path being frequency selective in a first frequency range corresponding to the radio signals, and provide a second signal path to the antenna, the second signal path being frequency selective in a second frequency range corresponding to the body-coupled-communication signals. The first signal path may have a high-pass filter characteristic and the second signal path may have a low-pass filter characteristic. The first and the second signal path may for example be provided by one or more frequency selective elements, such as the abovementioned frequency selective element 113 or the capacitor 115.

It should be understood that the steps of the method of FIG. 6 do not need to be performed in the illustrated order. In particular, the generation of the radio signals of step 610 may also be performed simultaneously with the generation of the BCC signals of step 620, and at step 630 the radio signals and the BCC signals may provided simultaneously to the antenna.

FIG. 7 illustrates a method which may be used for receiving of data by the device.

At step 710, the device receives radio signals. This is accomplished via the antenna. The radio signals may for example be in a first frequency range above 500 MHz, typically above 600 MHz. The radio signals may be based on one or more cellular radio technologies, e.g., GSM, UMTS, LTE, CDMA2000. In addition or as an alternative, the radio signals may be based on a WLAN technology and/or on a WPAN radio technology, such as Bluetooth, NFC, or ZigBee. Further, the radio signals may be based on a satellite navigation technology, such as GPS.

At step 720, the device receives BCC signals via the same antenna as used for receiving the radio signals of step 720. The BCC signals may for example be in a second frequency range below 50 MHz, more specifically below 20 MHz.

Accordingly, the antenna of the device is not only operated to convert electromagnetic waves to the radio signals, but also acts as a BCC coupling element for transferring the BCC signals from the body of a user of the device to the device, e.g., by capacitive coupling.

At step 730, the device may separate the radio signals and the BCC signals. This may be accomplished by one or more frequency selective elements, such as the above-mentioned frequency selective element 113 or the capacitor 115. The frequency selective element may provide a first signal path to the antenna, the first signal path being frequency selective in a first frequency range corresponding to the radio signals, and provide a second signal path to the antenna, the second signal path being frequency selective in a second frequency range corresponding to the body-coupled-communication signals. The first signal path may have a high-pass filter characteristic and the second signal path may have a low-pass filter characteristic.

For further processing, the received radio signals and BCC signals may then be provided to one or more communication modules of the device. For example, such further processing may involve demodulation or decoding to obtain data. For example, in the case of the device 100 the radio signals may be processed by the RF transceiver 120 and the processor(s) 140 executing the program code of the radio communication module 160, and the BCC signals may be processed by the BCC transceiver 130 and the processor(s) 140 executing the program code of the BCC communication module 170.

It should be understood that the steps of the method of FIG. 7 do not need to be performed in the illustrated order. In particular, the reception of the radio signals of step 710 may also be performed simultaneously with the reception of the BCC signals of step 720.

Further, it should be understood that the sending of data as illustrated by FIG. 6 and the receiving of data as illustrated by FIG. 7 may be combined to achieve bidirectional transmission of data.

As can be seen, the concepts as explained above allow for efficiently supporting both radio connectivity and BCC connectivity of a device. in particular, the same antenna may be used both for sending or receiving the radio signals and for coupling the BCC signals to the user's body. By allowing simultaneous usage of the antenna for both the radio signals and the BCC signals, also switching between different communication protocols or signal processing elements may be avoided.

It is to be understood that the concepts as explained above are susceptible to various modifications. For example, the concepts could be applied in various kinds of devices and in connection with various types of radio technologies. Further, the concepts are not limited to a specific implementation of the BCC technology. Still further, it should be understood that the concepts may be used in connection with various types of antennas.

The invention claimed is:

1. A device, comprising:
   at least one communication module supporting communication on the basis of radio signals and communication on the basis of body-coupled-communication signals,
   an antenna for transmission of the radio signals, and
   a frequency selective element connected between the antenna and the at least one communication module, the frequency selective element providing a first signal path in a first frequency range corresponding to the radio signals and a second signal path in a second frequency range corresponding to the body-coupled-communication signals, wherein the first signal path has a high-pass filter characteristic and the second signal path has a low-pass filter characteristic,
   wherein the antenna is further operable to transfer the body-coupled-communication signals between the device and a body of a user of the device and wherein the transmission of the radio signals and the transfer of the body-coupled-communication signals by the antenna occur simultaneously.

2. The device according to claim 1,
   wherein the first frequency range is above 500 MHz and the second frequency range is below 50 MHz.

3. The device according to claim 1,
   wherein the antenna and the frequency selective element are formed on the same printed circuit board.

4. The device according to claim 1,
   wherein the antenna is of an L-type.

5. The device according to claim 1,
   wherein the antenna is of an F-type.

6. The device according to claim 5,
   wherein a frequency selective element is connected between a feed connection of the antenna and the at least one communication module.

7. The device according to claim 5,
   wherein a first signal path of a frequency selective element is connected between a grounding connection of the antenna and a grounding point, and
   wherein a second signal path of the frequency selective element is connected between the grounding connection of the antenna and the at least one communication module.

8. The device according to claim 1,
   wherein the frequency selective element is connected between a feed connection of the antenna and the at least one communication module.

9. The device according to claim 8, comprising:
   a capacitor connected between a grounding connection of the antenna and a grounding point.

10. The device according to claim 9,
    wherein the first signal path of the frequency selective element is connected between a grounding point and a grounding connection of a parasitic element of the antenna, and
    wherein the second signal path of the frequency selective element is connected between the grounding connection of the parasitic element and the at least one communication module.

11. The device according to claim 1,
    wherein the first signal path of the frequency selective element is connected between a grounding connection of the antenna and a grounding point, and
    wherein the second signal path of the frequency selective element is connected between the grounding connection of the antenna and the at least one communication module.

12. The device according to claim 11, comprising:
    a capacitor connected between a feed connection of the antenna and the at least one communication module.

13. The device according to claim 1,
    wherein the antenna is of a capacitively and/or inductively fed type.

14. The device according to claim 1,
    wherein the first signal path of the frequency selective element is connected between a grounding point and a grounding connection of a parasitic element of the antenna, and
    wherein the second signal path of the frequency selective element is connected between the grounding connection of the parasitic element and the at least one communication module.

15. The device according to claim 1,
    wherein the radio signals are based on a cellular radio technology.

16. The device according to claim 1,
    wherein the radio signals are based on a wireless local area network technology.

17. The device according to claim 1,
    wherein the radio signals are based on a wireless personal area network radio technology.

18. The device according to claim 1,
    wherein the radio signals are based on a satellite navigation technology.

19. A method, comprising:
    a device communicating data on the basis of radio signals via an antenna of the device;
    the device communicating data on the basis of body-coupled-communication signals which are transferred via the antenna between the device and a body of a user of the device and wherein the transmission of the radio signals and the transfer of the body-coupled-communication signals by the antenna occur simultaneously;
    providing a first signal path to the antenna, the first signal path being frequency selective in a first frequency range corresponding to the radio signals; and
    providing a second signal path to the antenna, the second signal path being frequency selective in a second frequency range corresponding to the body-coupled-communication signals,
    wherein the first signal path has a high-pass filter characteristic and the second signal path has a low-pass filter characteristic.

20. The method according to claim 19,
    wherein the first frequency range is above 500 MHz and the second frequency range is below 50 MHz.

21. The method according to claim 19,
    wherein the radio signals are based on a cellular radio technology.

22. The method according to claim 19,
    wherein the radio signals are based on a wireless local area network technology.

23. The method according to claim 19,
wherein the radio signals are based on a wireless personal area network radio technology.

24. The method according to claim 19,
wherein the radio signals are based on a satellite navigation technology.

\* \* \* \* \*